US006386802B1

(12) United States Patent
Negri et al.

(10) Patent No.: US 6,386,802 B1
(45) Date of Patent: May 14, 2002

(54) HAND DRILL AND METHOD OF USE

(76) Inventors: Domenick J. Negri, 78 Springfield, Mission Viejo, CA (US) 92692; Mario Pascuale Mangone, 1237 Westridge Dr., Ventura, CA (US) 93003

( * ) Notice: Subject to any disclaimer, the term of this patent is extended or adjusted under 35 U.S.C. 154(b) by 10 days.

(21) Appl. No.: 09/728,675

(22) Filed: Dec. 1, 2000

Related U.S. Application Data

(60) Provisional application No. 60/225,799, filed on Aug. 16, 2000.

(51) Int. Cl.[7] .......................... B23B 35/00; B23B 45/14

(52) U.S. Cl. ................... 408/1 R; 408/110; 408/241 G; 408/712

(58) Field of Search ................................ 408/1 R, 110, 408/124, 712, 241 R, 241 G

(56) References Cited

U.S. PATENT DOCUMENTS 3,107,556 A 10/1963 Pugsley
3,141,360 A * 7/1964 Wolf .......................... 408/110
3,664,754 A 5/1972 Kelbel
3,827,822 A 8/1974 Converse
3,835,527 A 9/1974 Cornair
4,566,169 A 1/1986 Vesely
4,729,698 A 3/1988 Haddon
4,810,137 A * 3/1989 Yang .......................... 408/712
5,006,022 A * 4/1991 Miller ........................ 408/712
5,147,162 A 9/1992 Capotosto et al.
5,165,827 A * 11/1992 Miller ........................ 408/110
5,445,479 A * 8/1995 Hillinger .................... 408/124

* cited by examiner

*Primary Examiner*—Daniel W. Howell
(74) *Attorney, Agent, or Firm*—Eric K. Karich

(57) ABSTRACT

A hand drill for rotating a cutter has a housing having a motor therein. The housing has a first end and a second end. A first planar surface of the housing extends between the first and second ends, the first planar surface being parallel to an axis of rotation of a chuck driven by the motor and extending from the first end of the housing. A second planar surface of the housing also extends between the first and second ends and is parallel to the axis. The first and second planar surfaces are spaced a first and second predetermined distance, respectively, from the axis, the second predetermined distance being different than the first predetermined distance. The first and second planar surfaces enable the hand drill to be used to drill precision holes without the use of a drill press.

12 Claims, 5 Drawing Sheets

HAND DRILL AND METHOD OF USE

CROSS-REFERENCE TO RELATED APPLICATIONS

This application for a utility patent claims the benefit of U.S. Provisional Application No. 60/225,799, filed Aug. 16, 2000.

STATEMENT REGARDING FEDERALLY SPONSORED RESEARCH

Not Applicable

BACKGROUND OF THE INVENTION

1. Field of the Invention

This invention relates generally to hand drills, and more particularly to a hand drill having geometrically correct guide surfaces aligned with an axis of a chuck of the hand drill thereby allowing the hand drill to be used to drill precision holes in a workpiece without the use of a drill press.

2. Description of Related Art

Conventional hand drills are typically shaped like a pistol. The drill housing is rounded in shape, which provides a comfortable fit in the user's hand, but does not lend to the accuracy of the drill. The prior art hand drills depend upon the hand guidance and stability of the user for accuracy in drilling. If increased precision is required, an accessory must typically be attached to the drill; or the user must use a drill press instead of a hand drill.

The following art defines the present state of this field:

D. Kelbel, U.S. Pat. No. 3,664,754, teaches a bubble type alignment device for use in upon and with hand drills comprising bubble type level chambers appropriately shaped and operably mounted to a conventional hand drill allowing a first such level which is aligned parallel to the drill bit and a second such level which is aligned perpendicular to the first.

L. E. Pugsley, U.S. Pat. No. 3,107,556, teaches a hand drill and drill guide combination applied to a motor driven drill.

Haddon, U.S. Pat. No. 4,729,698, teaches a portable electrical power tool constituted by two cooperating main components, namely, a power head of predetermined exterior cross-sectional shape and a sleeve with interior surfaces mating to the power head to afford relative sliding movement, but not relative rotational movement of the two.

Cornair, U.S. Pat. No. 3,835,527, teaches a universal, multi-purpose support table for simultaneously supporting a work piece and at least one power or other tool at various horizontal and vertical positions with respect to the work piece.

Converse, U.S. Pat. No. 3,827,822, teaches a guided tool for controlling the attack of a tool against a work face wherein a keyway slidably mates with a key on a tool housing, so that the tool is guided toward a work piece in a predetermined attitude.

Capotosto et al., U.S. Pat. No. 5,147,162, teaches a self-guidable portable electric drill having as an integral appendage of the motor housing a V-grooved channel which is instrumental in guiding the drill on an axis perpendicular to the work surface when the trough of the V-groove is butted against, and slidably moved downwardly along the blade of the common try or combination square standing perpendicularly on the work surface.

Vesely, U.S. Pat. No. 4,566,169, teaches a building set including at least a drive motor, a spindle stock and a support element for holding these elements.

The prior art teaches hand drills having various attachments for making precision cuts. However, the prior art does not teach a hand drill having a geometrically correct housing that allows the hand drill to make precision cuts without attachments. The present invention fulfills these needs and provides further related advantages as described in the following summary.

SUMMARY OF THE INVENTION

The present invention teaches certain benefits in construction and use which give rise to the objectives described below.

The present invention provides a hand drill for rotating a cutter. The hand drill includes a housing having a motor therein. The housing has a first end and a second end. A first planar surface of the housing extends between the first and second ends, the first planar surface being parallel to an axis of rotation of a chuck driven by the motor and extending from the first end of the housing. A second planar surface of the housing also extends between the first and second ends and is parallel to the axis. The first and second planar surfaces are spaced a first and second predetermined distance, respectively, from the axis, the second predetermined distance being different than the first predetermined distance. The first and second planar surfaces enable the hand drill to be used to drill precision holes without the use of a drill press.

A primary objective of the present invention is to provide a hand drill having advantages not taught by the prior art.

Another objective is to provide a hand drill that enables a user to make precision cuts without the use of a drill press.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
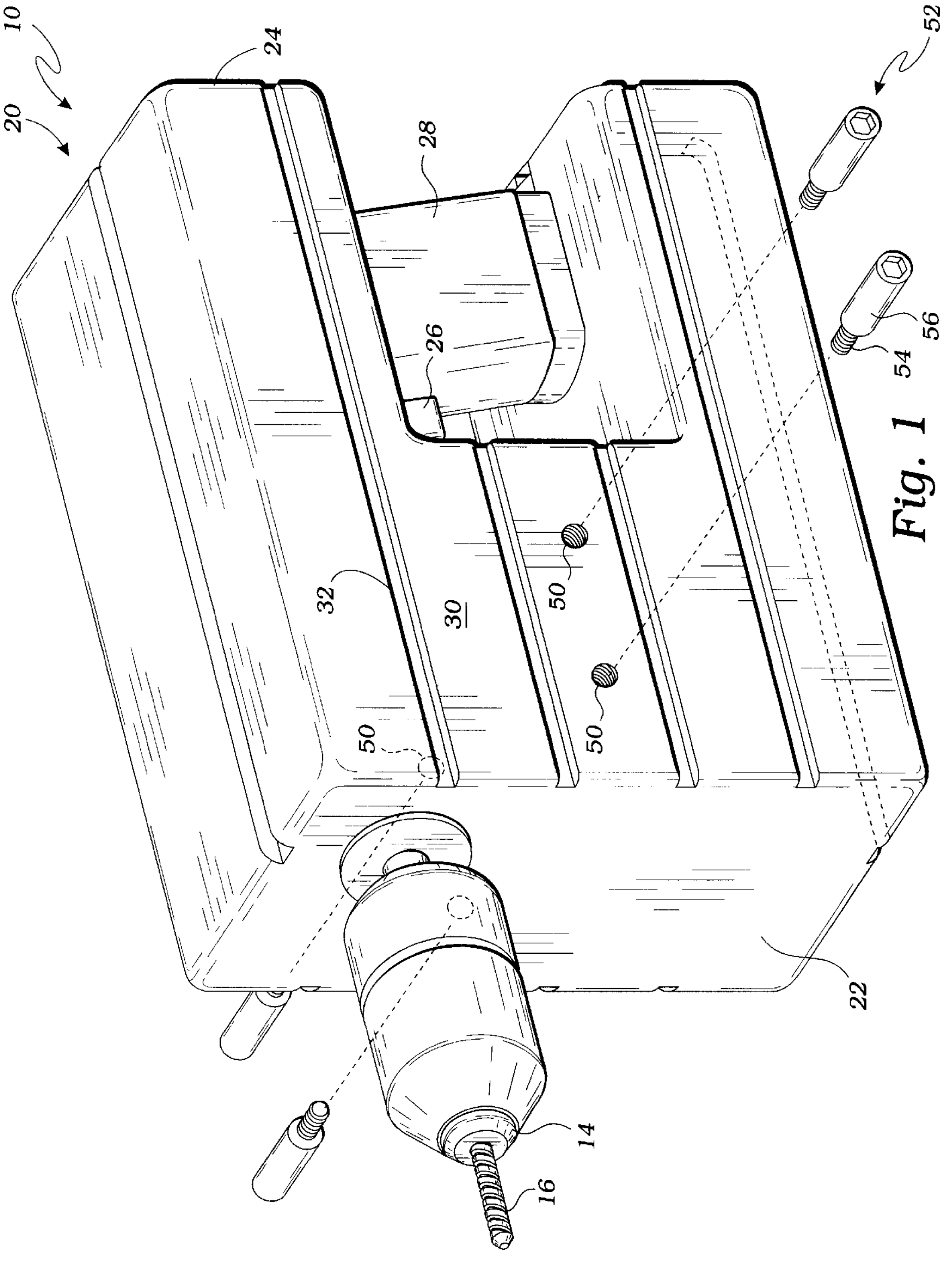
FIG. 1 is a front perspective partially exploded view of the preferred embodiment of the present invention.

The above described drawing figures illustrate the invention, a hand drill 10 for rotating a cutter 16. The hand drill 10 includes a housing 20 having a motor 12 therein. The housing 20 has a first end 22 and a second end 24. A first planar surface 30 of the housing 20 extends between the first and second ends 22 and 24, the first planar surface 30 being parallel to an axis of rotation of a chuck 14 driven by the motor 12 and extending from the first end 22 of the housing 20. A second planar surface 40 of the housing 20 also extends between the first and second ends 22 and 24 and is parallel to the axis. The first and second planar surfaces 30 and 40 are spaced first and second predetermined distances D1 and D2, respectively, from the axis, the second predetermined distance D2 being different than the first predetermined distance D1. As described below, the first and second planar surfaces 30 and 40 enable the hand drill 10 to be used to drill precision holes without the use of a drill press.

The general construction of the hand drill 10 is similar to standard hand operated power drills. The motor 12 is operably connected to the chuck 14 extending from the first end 22 of the housing 20, the chuck 14 being driven by the motor 12 to rotate a cutter 16 such as a drill bit around an axis. The motor 12 is an electric motor that is powered either by a power cord 18 that can be connected to a standard power socket in a home, or by a portable battery (not shown), as is well known in the art. The motor 12 is operatively controlled by a trigger 26 mounted in a hand grip 28. The hand grip 28 is constructed to allow the user to easily grasp and direct the hand drill 10 during use. The hand grip 28 is preferably positioned in the second end 24 of the housing, offset such that the hand grip 28 is directly behind the chuck 14, thereby providing the user maximum stability while driving the cutter 16 into a workpiece. A typical hand drill is disclosed in Kelbel, U.S. Pat. No. 3,664,754, which is hereby incorporated by reference in full.

As shown in FIGS. 1–6, the critical feature of the present invention is the structure of the housing 20 of the hand drill 10. The housing 20 includes at least one planar surface, the first planar surface 30, extending between the first and second ends 22 and 24 of the housing 20 parallel to the axis. The housing 20 is preferably rectangular in cross section, including second, third and fourth planar surfaces 40, 60, and 70. The second and fourth planar surfaces 40 and 70 are perpendicular to both the first and third planar surfaces 30 and 60, and are parallel to the axis. By constructing the housing 20 to be geometrically correct, the hand drill 10 is useful for drilling precision holes in the workpiece in a self-supporting fashion, either by sliding the hand drill 10 on a planar work surface 2 directly, or by using the hand drill 10 in conjunction with simple guides and tools that are themselves geometrically correct.

Figure 3:
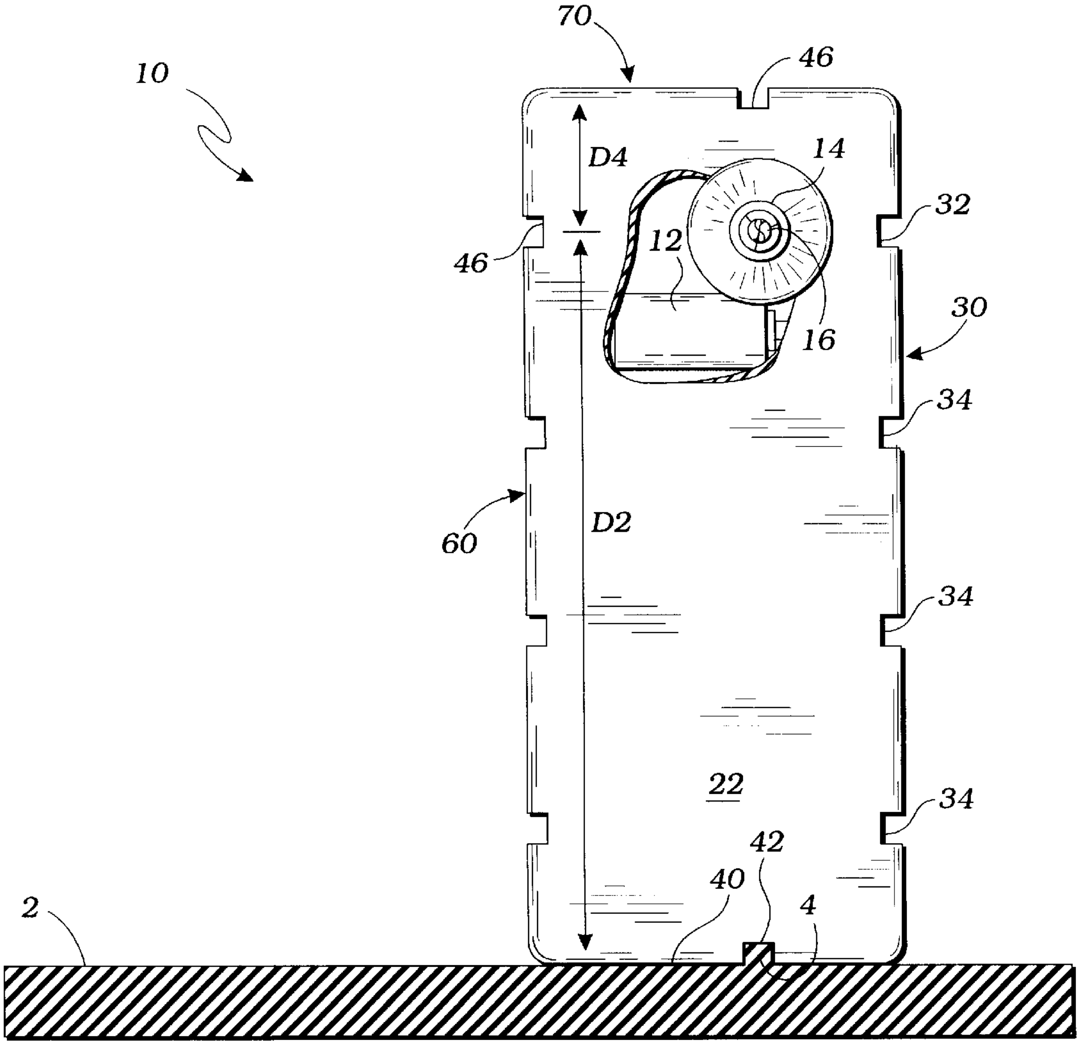
FIG. 3 is a sectional view thereof taken along line 3—3 in FIG. 2.
Figure 4:
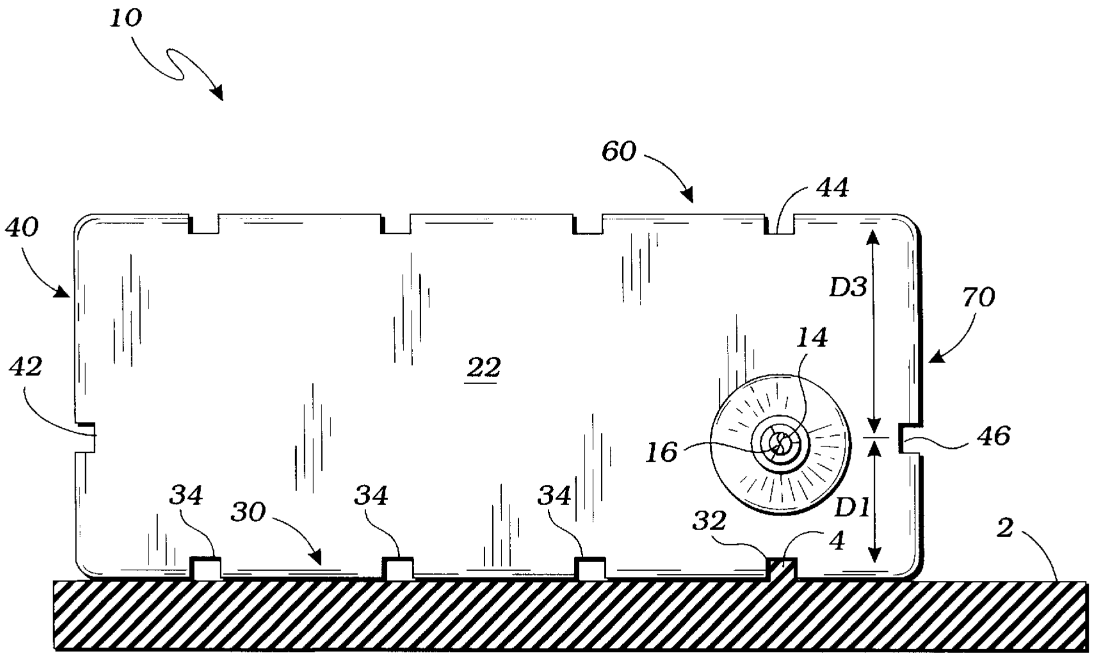
FIG. 4 is a front elevational sectional view thereof illustrating the hand drill positioned on a first planar surface.
Figure 5:
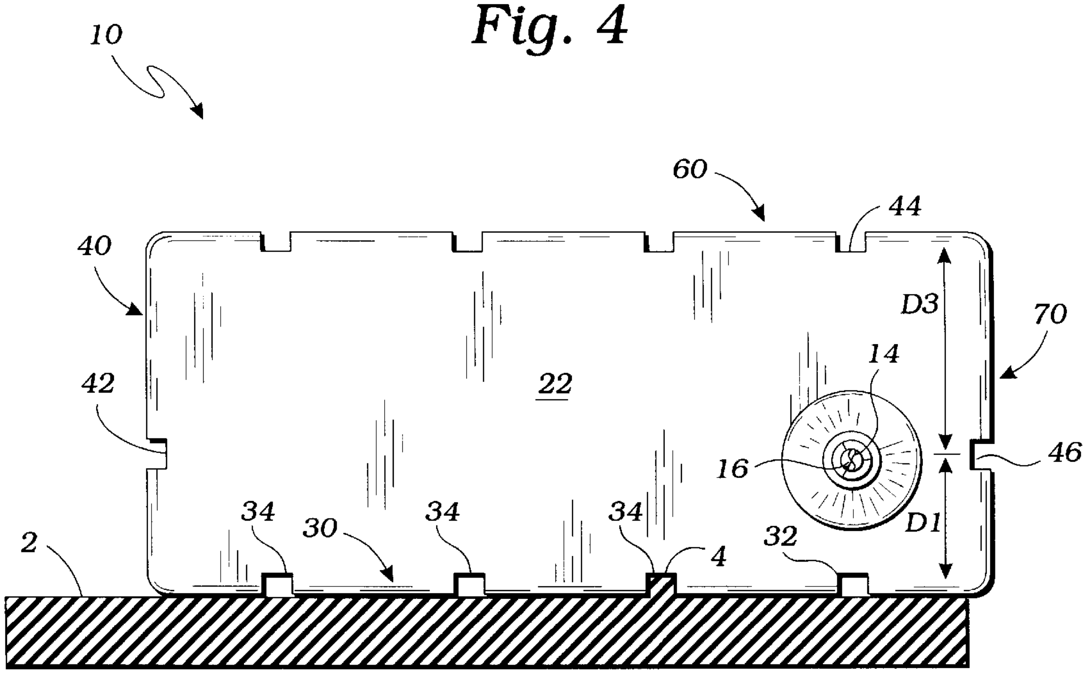
FIG. 5 is a front elevational sectional view thereof illustrating the hand drill once it has been shifted laterally to one of a plurality of lateral spacing guidance grooves.

Another important feature of the housing 20 is that the first and second planar surfaces 30 and 40, and preferably also the third and fourth parallel surfaces 60 and 70, are spaced predetermined distances from the axis. As shown in FIGS. 3–5, the first, second, third, and fourth planar surfaces 30, 40, 60, and 70 are spaced first, second, third, and fourth predetermined distances D1, D2, D3, and D4, respectively, from the axis. The second predetermined distance D2 is preferably different than the first predetermined distance D1, and the third predetermined distance D3 is preferably different than either the first or second predetermined distances D1 or D2. In the most preferred embodiment, the first predetermined distance D1 is 1 inch, the second predetermined distance D2 is 4 inches, the third predetermined distance D3 is 2 inches, and the fourth predetermined distance D4 is 1 inch, although those skilled in the art may devise many different measurements, including metric measurements of different distances.

This geometrically correct construction enables the power tool to provide precision spacing simply by resting the power tool on the appropriate planar surface. For example, if the user wants to drill a series of holes that are 1 inch from the edge of the workpiece, the user simply rests the workpiece on the planar work surface 2, rests the hand drill 10 on the first planar surface 30, as shown in FIG. 4, and slides the hand drill 10 into the workpiece. The resulting holes will all be spaced 1 inch from the edge of the workpiece simply by virtue of the construction of the housing 20 and its geometrically correct relationship with the axis of the chuck 14 and cutter 16. If the user wants to make holes 4 inches from the edge of the workpiece, the hand drill 10 is positioned on the second planar surface 40, as shown in FIG. 3, and the above-described process is repeated.

In the preferred embodiment, the hand drill 10 further includes a guidance groove 32 in the first planar surface 30. The guidance groove 32 is parallel to the axis, and enables the hand drill 10 to be guided in the precise path of a guidance ridge 4 on the planar work surface 2. The guidance groove 32 is preferably located on a line formed by the intersection of a plane that passes through the axis and is perpendicular to the first planar surface 30. In the preferred embodiment, the hand drill 10 further includes a second, third, and fourth guidance grooves 42, 44, and 46 in the second, third, and fourth planar surfaces 40, 60, and 70. As with the guidance groove 32, the second, third, and fourth guidance grooves 42, 44, and 46 are located on a line formed by the intersection of a plane that passes through the axis and is perpendicular to the second, third, and fourth planar surfaces 40, 60, and 70, respectively.

As shown in FIGS. 1–6, the housing 20 preferably further includes a plurality of lateral spacing guidance grooves 34 located in the first planar surface 30, and optionally also in the second, third, and/or fourth planar surfaces 40, 60, and 70. The plurality of lateral spacing guidance grooves 34 are parallel to the guidance groove 32 and laterally spaced a predetermined lateral distance from the guidance groove 32. As shown in FIGS. 4 and 5, the plurality of lateral spacing guidance grooves 34 enable easy control over the lateral spacing of the holes drilled by the hand drill 10 simply by moving the hand drill 10 over the engage each of the plurality of lateral spacing guidance grooves 34 with the guidance ridge 4.

Figure 2:
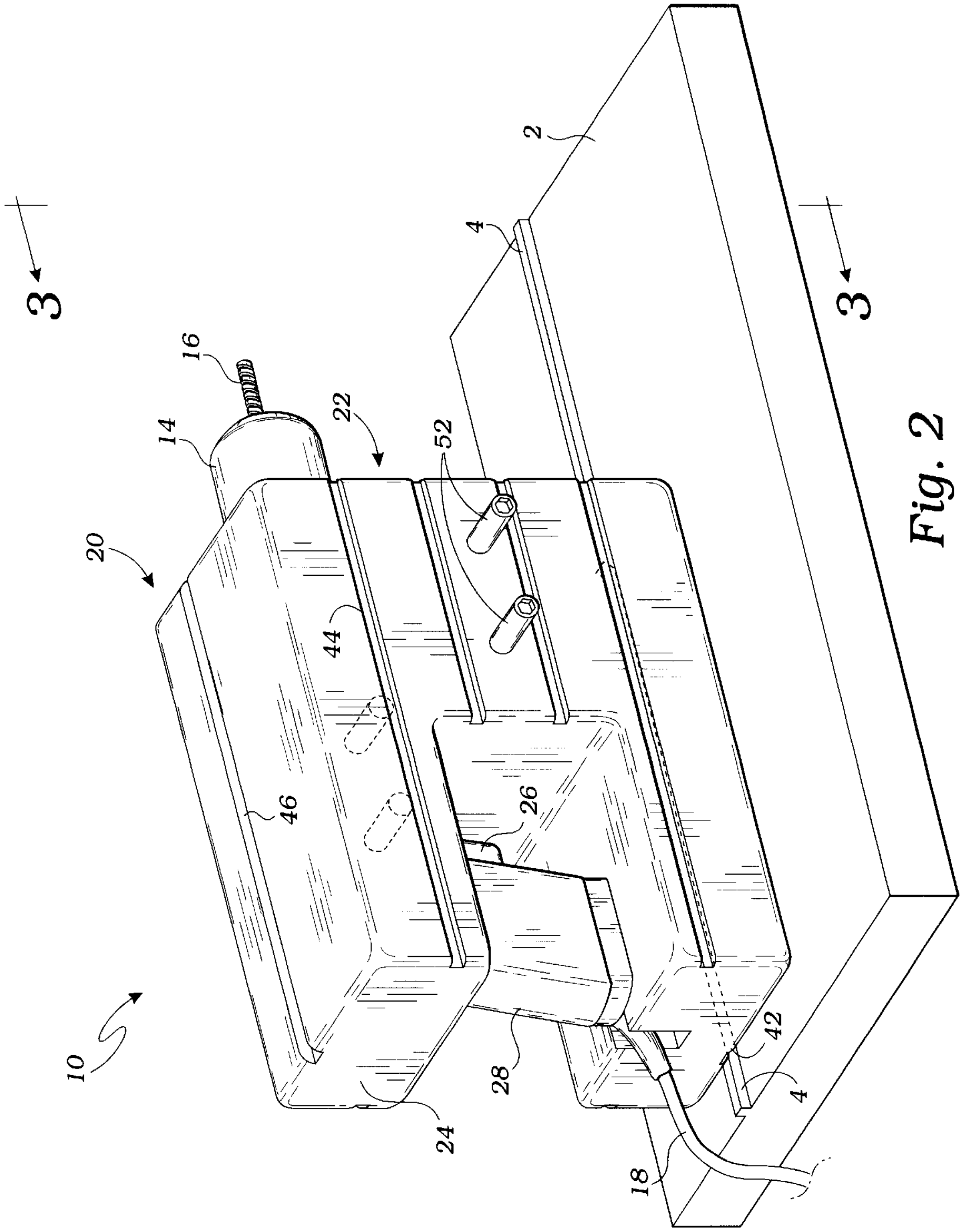
FIG. 2 is a rear perspective view thereof illustrating the hand drill sliding along guidance ridge of a work surface.
Figure 6:
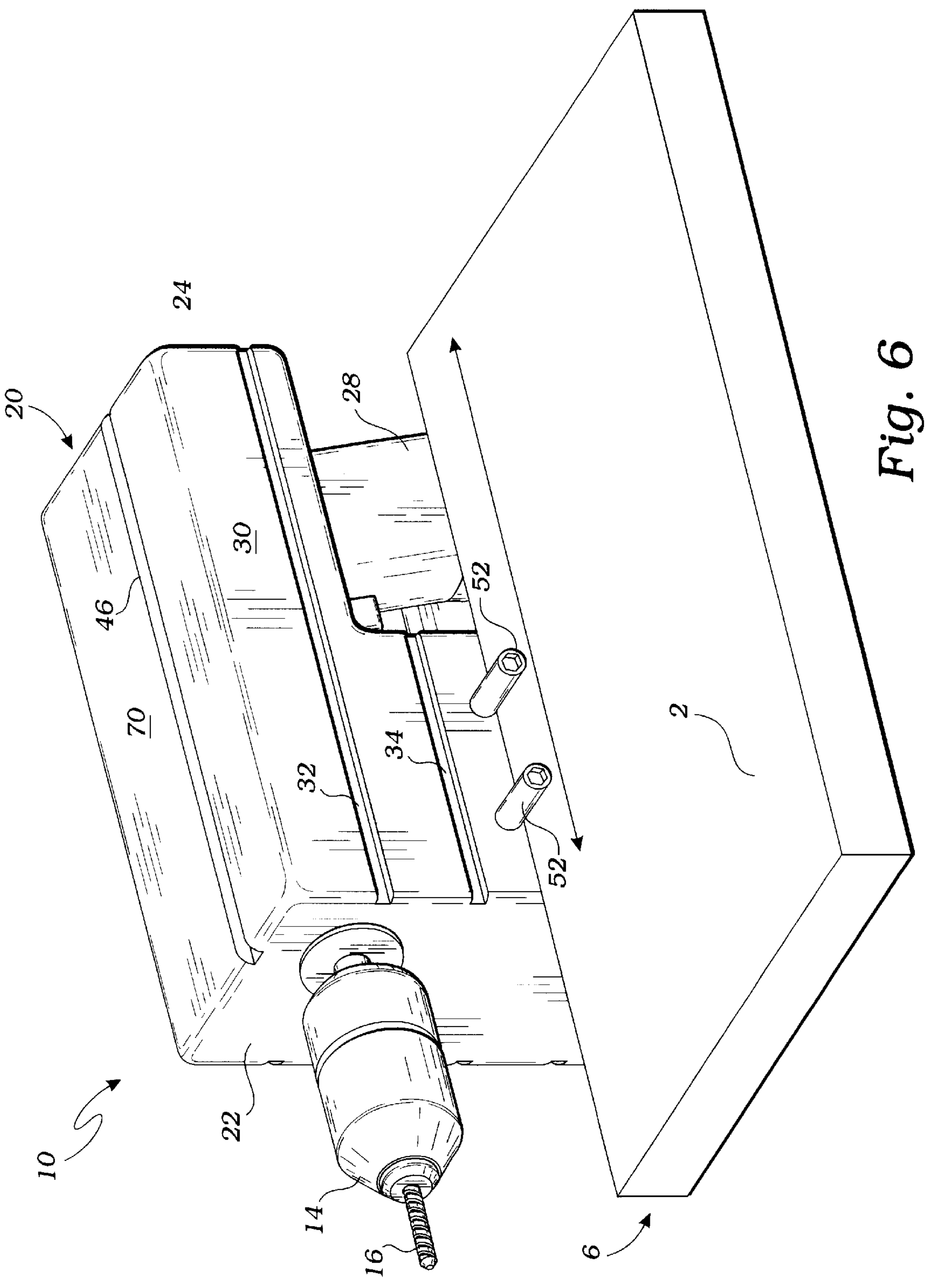
FIG. 6 is a perspective view of the hand drill resting upon the work surface supported and guided by a pair of alignment studs sliding along the work surface.

As shown in FIGS. 1, 2, and 6, the housing 20 preferably further includes a pair of alignment bores 50 in the first planar surface 30, and a pair of alignment studs 52 that mate with each of the pair of alignment bores 50. The pair of alignment bores 50 are positioned such that a line through the pair of alignment bores 50 is parallel to the axis. The pair of alignment studs 52 each have an insertion end 54 and a protruding end 56, the insertion end 54 of each of the pair of alignment studs 52 fitting into one of the pair of alignment bores 50. The insertion end 54 of each of the pair of alignment studs 52 preferably threadedly engages one of the pair of alignment bores 50, although frictional fits and other mating techniques known to those skilled in the art are also acceptable.

The invention includes a method for drilling a hole in a workpiece using the above-described hand drill 10 using a cutter 16 such as the drill bit 16 described above. The drill bit 16 is locked in the chuck 14 and tightened as is well known in the prior art. A planar work surface 2 such as a typical work bench is provided, preferably including a guidance ridge 4 which can be built into the work bench or provided by a separate tool that is placed on top of the work bench. The workpiece is fastened to the work bench, preferably using a vice or similar mechanism, locking the workpiece in a predetermined position with respect to the planar work surface 2 and the guidance ridge 4. As shown in FIG. 4, the hand drill 10 is positioned on the planar work surface 2 such that the first planar surface 30, or another of the planar surfaces described above, contacts the planar work surface 2. The guidance ridge 4 is positioned to engage the guidance groove 32 such that the cutter 16 is pointed towards the workpiece. Once positioned properly, the user only needs to slide the hand drill 10 across the planar work surface 2, along the guidance ridge 4, until the cutter 16 cuts the desired hole in the workpiece. The geometry of the first planar surface 30 and the guidance groove 32 guide the cutter 16 of the hand drill 10, guaranteeing a precision cut regardless of the capabilities of the user of the hand drill 10. A similar process can be repeated with the hand drill 10 on any of the planar surfaces.

After the first cut has been made, the hand drill 10 can be moved laterally to one of the plurality of lateral spacing guidance grooves 34, as shown in FIG. 5, for a second cut. This process can be repeated, thereby providing a series of precision cuts, each cut being laterally spaced by the predetermined lateral distance provided between the plurality of lateral spacing guidance grooves 34.

As shown in FIG. 6, a similar precision cut can be used without the use of the guidance ridge 4 by using the pair of alignment studs 52 provided with the preferred embodiment. The insertion end 54 of each of the pair of alignment studs 52 is inserted into one of the pair of alignment bores 50 of the hand drill 10, thereby securely locking them in place. The workpiece is fastened in a predetermined position with respect to the planar work surface 2 and a linear terminal edge 6 of the planar work surface 2. The hand drill 10 is positioned such that the first planar surface 30 contacts the linear terminal edge 6, the pair of alignment studs 52 each abut the planar work surface 2, and the cutter 16 is pointed towards the workpiece. Once properly positioned, the user simply slides the hand drill 10 along the linear terminal edge 6, keeping each of the pair of alignment studs 52 in contact with the planar work surface 2, until the cutter 16 cuts the desired hole in the workpiece.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A hand drill for rotating a cutter, the hand drill comprising:

a housing having a motor therein, the housing having a first end and a second end;

a chuck extending from the first end of the housing, the chuck being driven by the motor to rotate the cutter around an axis;

a first planar surface of the housing extending between the first and second ends, the first planar surface being parallel to the axis and spaced a first predetermined distance from the axis; and a second planar surface of the housing extending between the first and second ends, the second planar surface being parallel to the axis and spaced a second predetermined distance from the axis, the second predetermined distance being different than the first predetermined distance.

2. The hand drill of claim 1 further comprising a third planar surface that is parallel to the axis, the second and third planar surfaces being perpendicular to each other.

3. The hand drill of claim 2 wherein the third planar surface is spaced a third predetermined distance from the axis, the third predetermined distance being different than the first and second predetermined distances.

4. The hand drill of claim 1 further comprising a guidance groove in the first planar surface, the guidance groove being parallel to the axis.

5. The hand drill of claim 4 wherein the guidance groove is located on a line formed by the intersection of a plane that passes through the axis and is perpendicular to the first planar surface.

6. The hand drill of claim 5 further comprising a plurality of lateral spacing guidance grooves in the first planar surface, each of the plurality of lateral spacing guidance grooves being perpendicular to the guidance groove and laterally spaced a predetermined lateral distance from the guidance groove.

7. The hand drill of claim 1 further comprising:

a pair of alignment bores in the first planar surface, the pair of alignment bores being positioned such that a line through the pair of alignment bores is parallel to the axis; and a pair of alignment studs, each of the pair of alignment studs having an insertion end and a protruding end, the insertion end of each of the pair of alignment studs fitting into one of the pair of alignment bores.

8. A hand drill for rotating a cutter, the hand drill comprising:

a housing having a motor therein, the housing having a first end and a second end;

a chuck extending from the first end of the housing, the chuck being driven by the motor to rotate the cutter around an axis;

a first planar surface of the housing extending between the first and second ends, the first planar surface being parallel to the axis and spaced a first predetermined distance from the axis; and a guidance groove in the first planar surface, the guidance groove being parallel to the axis.

9. The hand drill of claim 8 wherein the guidance groove is located on a line formed by the intersection of a plane that passes through the axis and is perpendicular to the first planar surface.

10. The hand drill of claim 8 further comprising:

a pair of alignment bores in the first planar surface, the pair of alignment bores being positioned such that a line through the pair of alignment bores is parallel to the axis; and a pair of alignment studs, each of the pair of alignment studs having an insertion end and a protruding end, the insertion end of each of the pair of alignment studs fitting into one of the pair of alignment bores.

11. A method for drilling a hole in a workpiece, the method comprising the steps of:

a) providing a cutter;

b) providing a hand drill for rotating the cutter, the hand drill comprising:

a housing having a motor therein, the housing having a first end and a second end;

a chuck extending from the first end of the housing, the chuck being driven by the motor to rotate the cutter around an axis;

a first planar surface of the housing extending between the first and second ends, the first planar surface being parallel to the axis and spaced a first predetermined distance from the axis; and a guidance groove in the first planar surface, the guidance groove being parallel to the axis and located on a line formed by the intersection of a plane that passes through the axis and is perpendicular to the first planar surface;

c) locking the cutter in the chuck;

d) providing a planar work surface having a guidance ridge;

e) fastening the workpiece in a predetermined position with respect to the planar work surface and the guidance ridge;

f) positioning the hand drill on the planar work surface such that the first planar surface contacts the planar work surface, the guidance ridge engages the guidance groove, and the cutter is pointed towards the workpiece; and g) sliding the hand drill across the planar work surface, along the guidance ridge, until the cutter cuts the desired hole in the workpiece.

12. A method for drilling a hole in a workpiece, the method comprising the steps of:

a) providing a cutter;

b) providing a hand drill for rotating the cutter, the hand drill comprising:

a housing having a motor therein, the housing having a first end and a second end;

a chuck extending from the first end of the housing, the chuck being driven by the motor to rotate the cutter around an axis;

a first planar surface of the housing extending between the first and second ends, the first planar surface being parallel to the axis and spaced a first predetermined distance from the axis;

a pair of alignment bores in the first planar surface, the pair of alignment bores being positioned such that a line through the pair of alignment bores is parallel to the axis; and a pair of alignment studs, each of the pair of alignment studs having an insertion end and a protruding end, the insertion end of each of the pair of alignment studs fitting into one of the pair of alignment bores;

c) locking the cutter in the chuck;

d) inserting the insertion end of each of the pair of alignment studs into one of the pair of alignment bores of the hand drill;

e) providing a planar work surface having a linear terminal edge;

f) fastening the workpiece in a predetermined position with respect to the planar work surface and the linear terminal edge;

g) positioning the hand drill on the planar work surface such that the first planar surface contacts the linear terminal edge, the pair of alignment studs each abut the planar work surface, and the cutter is pointed towards the workpiece; and h) sliding the hand drill along the linear terminal edge, keeping each of the pair of alignment studs in contact with the planar work surface, until the cutter cuts the desired hole in the workpiece.

* * * * *